Sept. 30, 1924.  R. J. MORGAN ET AL  1,509,975
COOKING VESSEL
Filed June 27, 1921
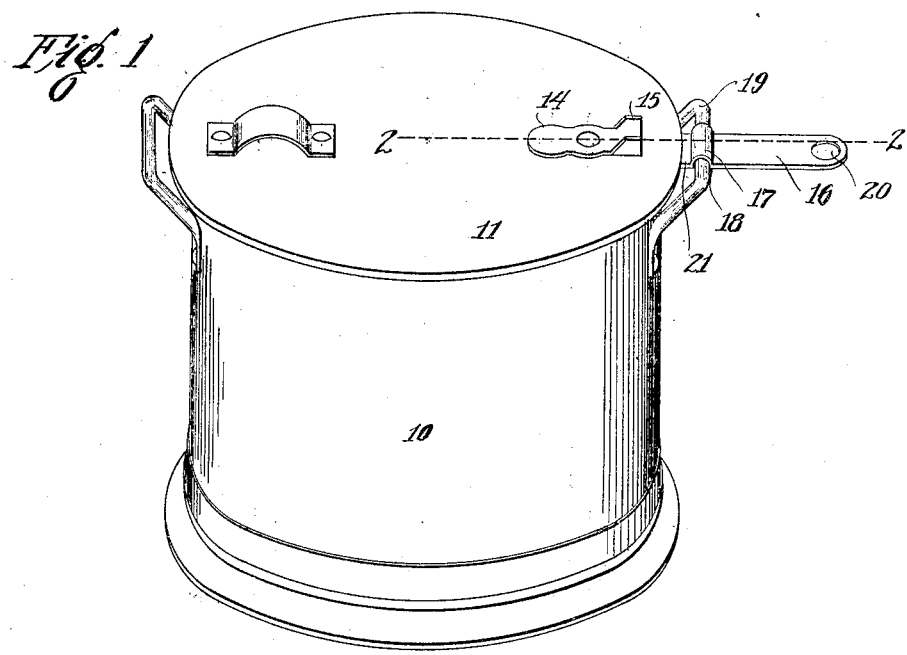
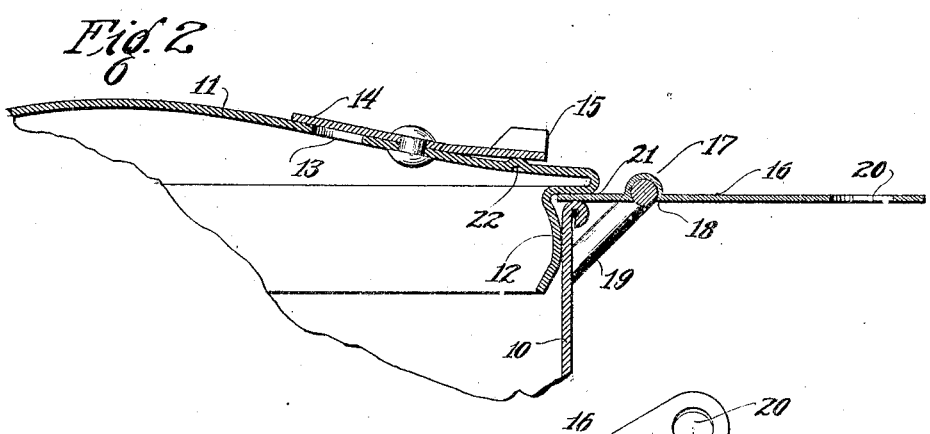
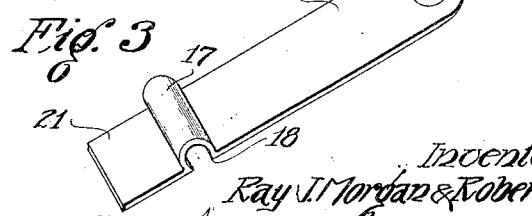
Inventors
Ray J. Morgan & Robert H. Wentorf
By Sprinkle Hopkins & McNair
Attys.
Witness
J. L. Brown.

Patented Sept. 30, 1924.

1,509,975

UNITED STATES PATENT OFFICE.

RAY J. MORGAN, OF CHICAGO, ILLINOIS, AND ROBERT H. WENTORF, OF WEST BEND, WISCONSIN, ASSIGNORS TO WEST BEND ALUMINUM COMPANY, A CORPORATION OF WISCONSIN.

COOKING VESSEL.

Application filed June 27, 1921. Serial No. 480,702.

*To all whom it may concern:*

Be it known that we, RAY J. MORGAN and ROBERT H. WENTORF, both citizens of the United States, said MORGAN residing at Chicago, in the county of Cook and State of Illinois, and said WENTORF residing at West Bend, in the county of Washington and State of Wisconsin, have invented certain new and useful Improvements in Cooking Vessels, of which the following is a specification.

The invention relates to cooking vessels and is more particularly directed to that class of boilers which have steam-tight covers and has for its primary object the provision of means for withdrawing a tight fitting cover from a cooking vessel and means for relieving the steam pressure within the vessel.

A further object of the invention is to provide a detachable means for withdrawing the cover of a cooking vessel therefrom.

A further object of the invention is to provide a simple and inexpensive means for removing the cover from a vessel when the vessel is at a high temperature and is filled with steam or hot water, without danger to the person removing the cover.

It is often a problem to a person who is using a boiler or the like to remove the cover therefrom when it becomes necessary without considerable risk of scalding themselves in the operation when the boiler is filled with steam or hot water, and it often results in more or less serious accidents.

Other objects of the invention will appear from the following description which is directed to the preferred embodiment of the invention, reference being had to the accompanying drawings forming a part of the specification, in which Fig. 1 is a perspective view of a boiler with my invention applied thereto; Fig. 2 is a sectional view taken on line 2—2 of Fig. 1 with parts broken away showing the pivoted arm with one end lying under the cover the vessel and a valve in the cover thereof for the escapement of steam. Fig. 3 is an enlarged detail of the arm or lever for removing the cover from the vessel.

Reference character 10 represent a boiler of well known construction. 11 is the cover thereof, which is adapted to have steam-tight engagement with the sides of the boiler 10 through its depending flange or apron 12. The cover 11 has aperture 13 therethrough which is adapted to be closed or opened by sliding valve 14 which has finger grips 15. Lever or arm 16 is looped intermediate its ends as at 17, the diameter of loop 17 being just sufficient at the open portion 18 to admit support 19 thereinto by slightly springing loop 17, the support 19 being so positioned upon the vessel as to cause lever or arm 16 to lie approximately in the same horizontal plane with the top of the wall of vessel 10 when the lever or arm is supported in a horizontal position.

From the foregoing it will readily be seen that the lever or arm 16 which has aperture 20 through one of its ends for the purpose of hanging it on a nail or peg while not in use, is readily detachable from the vessel and may be used for the purpose of removing the covers from various vessels.

The operation of the device is as follows: When the cover of the vessel is to be placed thereon, the end of the short arm 21 of the lever is inserted between the overhanging lip of the cover and the top of the side wall of the vessel as shown in Fig. 2 and the lever being fulcrumed on support 19 it will readily and easily pry the cover from its engagement with the vessel by a comparatively slight downward pressure on the outward end thereof.

Having thus described our invention, what we claim is:

The combination with a cooking vessel, of a cover, a support carried by said vessel, an arm detachably supported by said support, a loop formed intermediate the ends of said arm and adapted to embrace said support, one end of said arm being adapted to lie between said cover and said vessel.

Signed at Chicago, Illinois, this 16 day of June, 1921.

RAY J. MORGAN.

Signed at West Bend, Wisconsin, this 16th day of June, 1921.

ROBERT H. WENTORF.